(12) United States Patent
Bai et al.

(10) Patent No.: US 11,917,606 B2
(45) Date of Patent: Feb. 27, 2024

(54) GROUP-BASED TIMING ADVANCE (TA) ADJUSTMENT

(71) Applicant: QUALCOMM Incorporated, San Diego, CA (US)

(72) Inventors: Tianyang Bai, Somerville, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 17/156,137

(22) Filed: Jan. 22, 2021

(65) Prior Publication Data
US 2022/0240268 A1 Jul. 28, 2022

(51) Int. Cl.
| | |
|---|---|
| H04W 72/121 | (2023.01) |
| H04W 4/08 | (2009.01) |
| H04L 5/00 | (2006.01) |
| H04W 52/14 | (2009.01) |
| H04W 72/23 | (2023.01) |
| H04W 84/00 | (2009.01) |

(52) U.S. Cl.
CPC ......... *H04W 72/121* (2013.01); *H04L 5/0055* (2013.01); *H04W 4/08* (2013.01); *H04W 52/146* (2013.01); *H04W 72/23* (2023.01); *H04W 84/005* (2013.01)

(58) Field of Classification Search
CPC ... H04W 72/121; H04W 4/08; H04W 52/146; H04W 72/1289; H04W 84/005; H04L 5/0055; H04L 5/0037; H04L 5/0096; H04L 5/0053
See application file for complete search history.

(56) References Cited

U.S. PATENT DOCUMENTS

| | | | | |
|---|---|---|---|---|
| 2015/0131636 A1* | 5/2015 | Tanaka | .............. | H04W 56/0015 370/336 |
| 2018/0227886 A1* | 8/2018 | Chou | ................... | H04B 7/0695 |
| 2019/0349915 A1* | 11/2019 | Ahn | ..................... | H04W 72/046 |
| 2021/0058113 A1* | 2/2021 | Jung | ..................... | H04B 7/086 |
| 2021/0160879 A1* | 5/2021 | Lin | ................... | H04W 72/0453 |
| 2021/0194571 A1* | 6/2021 | Ma | ..................... | H04B 7/18558 |
| 2021/0359745 A1* | 11/2021 | Farag | ................ | H04W 72/0413 |
| 2022/0039138 A1* | 2/2022 | Takeda | .................. | H04L 5/0053 |
| 2022/0124807 A1* | 4/2022 | Hu | ...................... | H04W 74/006 |
| 2022/0141819 A1* | 5/2022 | Yang | .................. | H04W 72/042 370/329 |
| 2022/0240284 A1* | 7/2022 | Zhou | ................. | H04W 52/0225 |
| 2023/0209465 A1* | 6/2023 | Zhou | ....................... | H04W 4/06 370/311 |
| 2023/0254794 A1* | 8/2023 | Park | .................. | H04B 7/18508 370/316 |
| 2023/0254795 A1* | 8/2023 | Ryu | ...................... | H04W 72/21 370/350 |

\* cited by examiner

*Primary Examiner* — Sharmin Chowdhury
(74) *Attorney, Agent, or Firm* — Arun Swain (57) ABSTRACT

A method of wireless communication by a user equipment (UE) includes receiving an indication that the UE has been added to a group. The method also includes receiving group common signaling informing the UE of a configuration change. A method of wireless communication by a base station includes defining a group of user equipments (UEs). The method also includes notifying each UE of the group of inclusion into the group of UEs. The method still further includes transmitting, to the group of UEs, group common signaling including a configuration change for the group of UEs.

30 Claims, 6 Drawing Sheets

GROUP-BASED TIMING ADVANCE (TA) ADJUSTMENT

BACKGROUND

Technical Field

The present disclosure relates generally to wireless communications, and more particularly to group-based configuration updates, such as a timing advance (TA) adjustment in a high speed train scenario.

INTRODUCTION

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

A UE may perform wireless communication while travelling on a high speed train, such as a train moving with a speed over 300 km/h. Wireless communications may benefit from improved techniques to address these high speed scenarios.

SUMMARY

In one aspect of the present disclosure, a method of wireless communication by a user equipment (UE) includes receiving an indication that the UE has been added to a group. The method further includes receiving group common signaling informing the UE of a configuration change.

Another aspect of the present disclosure is directed to an apparatus for a UE for wireless communication. The apparatus has a memory and one or more processors coupled to the memory. The processor(s) is configured to receive an indication that the UE has been added to a group. The processor(s) is further configured to receive group common signaling informing the UE of a configuration change.

In a further aspect of the present disclosure, a method of wireless communication by a base station includes defining a group of user equipments (UEs). The method further includes notifying each UE of the group of inclusion into the group of UEs. The method still further includes transmitting, to the group of UEs, group common signaling including a configuration change for the group of UEs.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a more particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

As noted above, wireless communications may occur in scenarios where a UE is travelling on a high speed train, such as a train moving with a speed over 300 km/h. In a high speed train scenario, a base station (e.g., gNB) may frequently send timing advance (TA) adjustment commands to UEs in the train, due to the high mobility nature of UEs traveling on the train. Further, a gNB may send the timing advance adjustment commands to a large number of UEs in the same train at the same time. To reduce overhead, it may be beneficial to group the UEs in the same train, and then send a common timing advance adjustment command to the grouped UEs.

Aspects of the present disclosure allow a gNB to dynamically group UEs based on signaling. The gNB can add or delete a UE from the group. Once a group is formed, the gNB can send a common command to request all UEs in the group to make the same configuration change, such as a timing advance adjustment. In addition to, or instead of, a timing advance adjustment, the gNB may send common commands to adjust other configurations, for example, beam configurations and/or uplink power control configurations.

Figure 1:
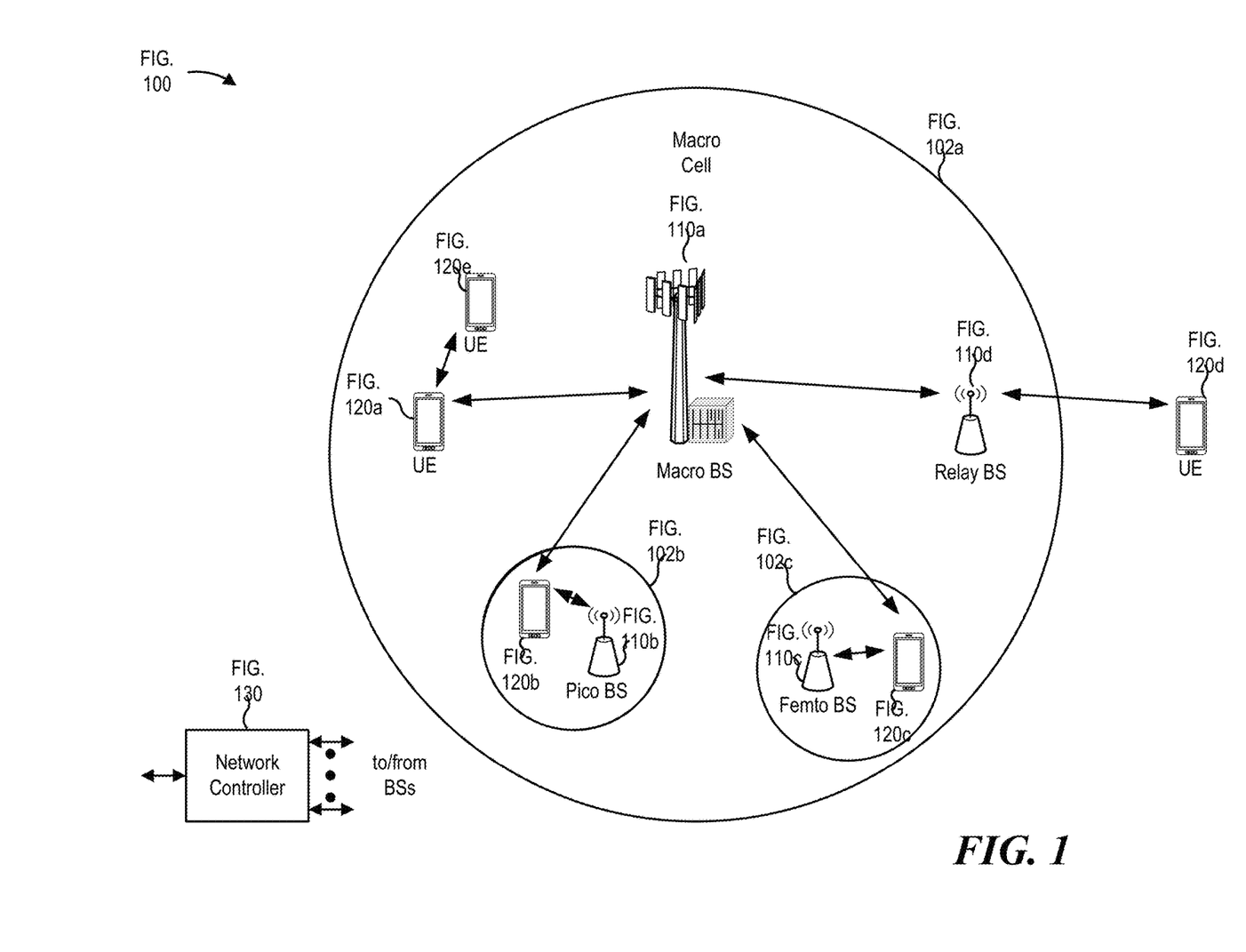
FIG. 1 is a block diagram conceptually illustrating an example of a wireless communications network, in accordance with various aspects of the present disclosure.

FIG. 1 is a diagram illustrating a network 100 in which a group-based configuration, for example in a high speed train scenario, may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110.

As indicated above, FIG. 1 is provided merely as an example. Other examples may differ from what is described with regard to FIG. 1.

Figure 2:
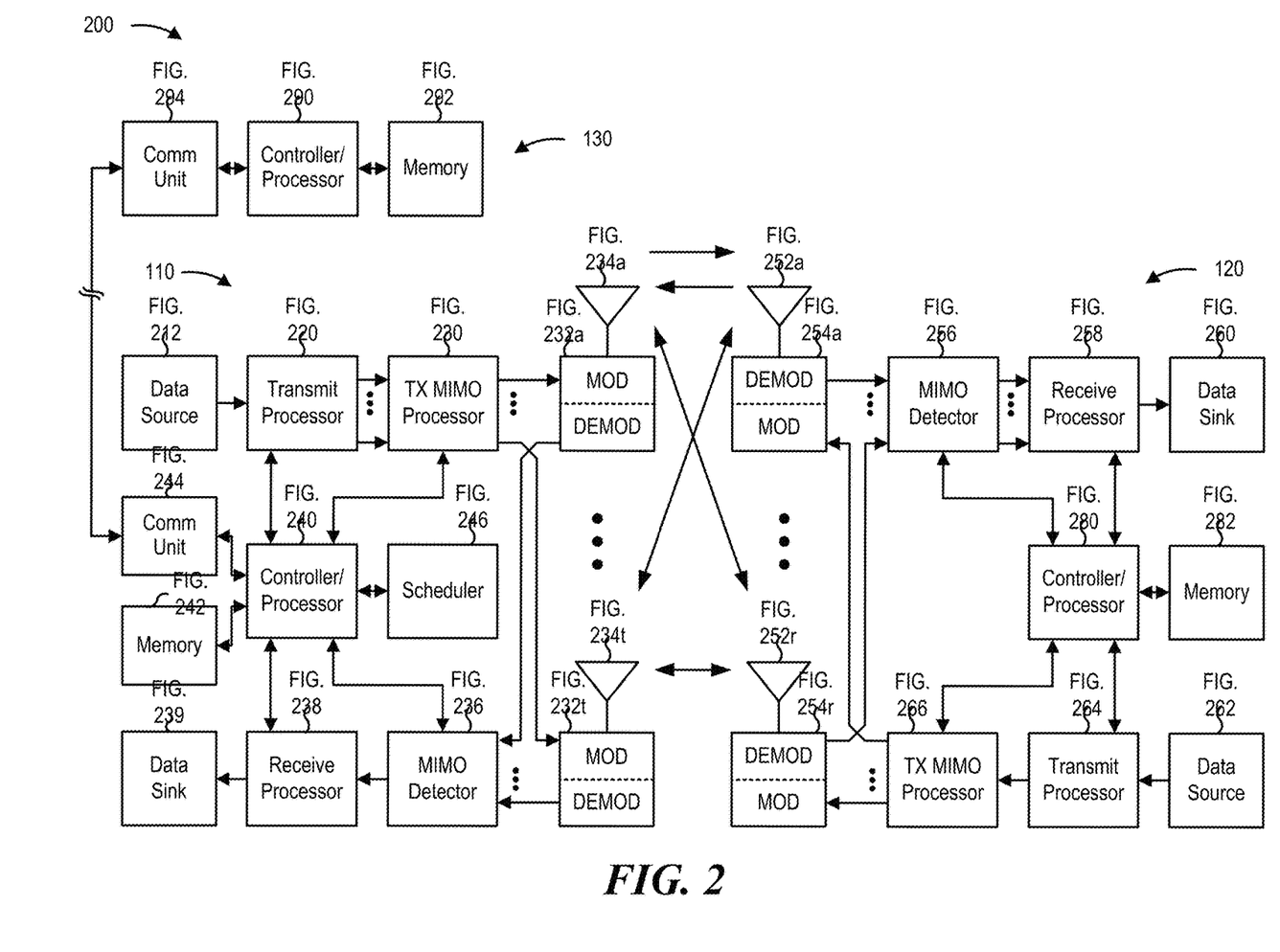
FIG. 2 is a block diagram conceptually illustrating an example of a base station in communication with a user equipment (UE) in a wireless communications network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 254, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communications unit 244 and communicate to network controller 130 via communications unit 244. Network controller 130 may include communications unit 294, controller/processor 290, and memory 292.

Controller/processor 240 of base station 110, controller/processor 280 of UE 120, and/or any other component(s) of FIG. 2 may perform one or more techniques associated with the group-based configuration, as described in more detail elsewhere. For example, controller/processor 240 of base station 110, controller/processor 280 of UE 120, and/or any other component(s) of FIG. 2 may perform or direct operations of, for example, the processes of FIGS. 5-7 and/or other processes as described. Memories 242 and 282 may store data and program codes for base station 110 and UE 120, respectively. A scheduler 246 may schedule UEs for data transmission on the downlink and/or uplink.

In some aspects, the UE 120 or base station 110 may include means for transmitting, means for determining, means for receiving, means for defining, means for notifying, and means for identifying. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

As described above, wireless communications may occur in scenarios where a UE is travelling on a high speed train, such as a train moving at a speed over 300 km/h. For sub-6 GHz systems (e.g., LTE, NR FR1 (new radio frequency range one), etc.), the single frequency network (SFN) method is typically considered for these scenarios. In the SFN method, multiple transmit and receive points (TRPs) transmit the same data on the same frequency and time resources, without analog beamforming. For millimeter wave systems (e.g., NR FR2 (new radio frequency range two)), beam management is employed due to the use of analog beamforming.

Figure 3:
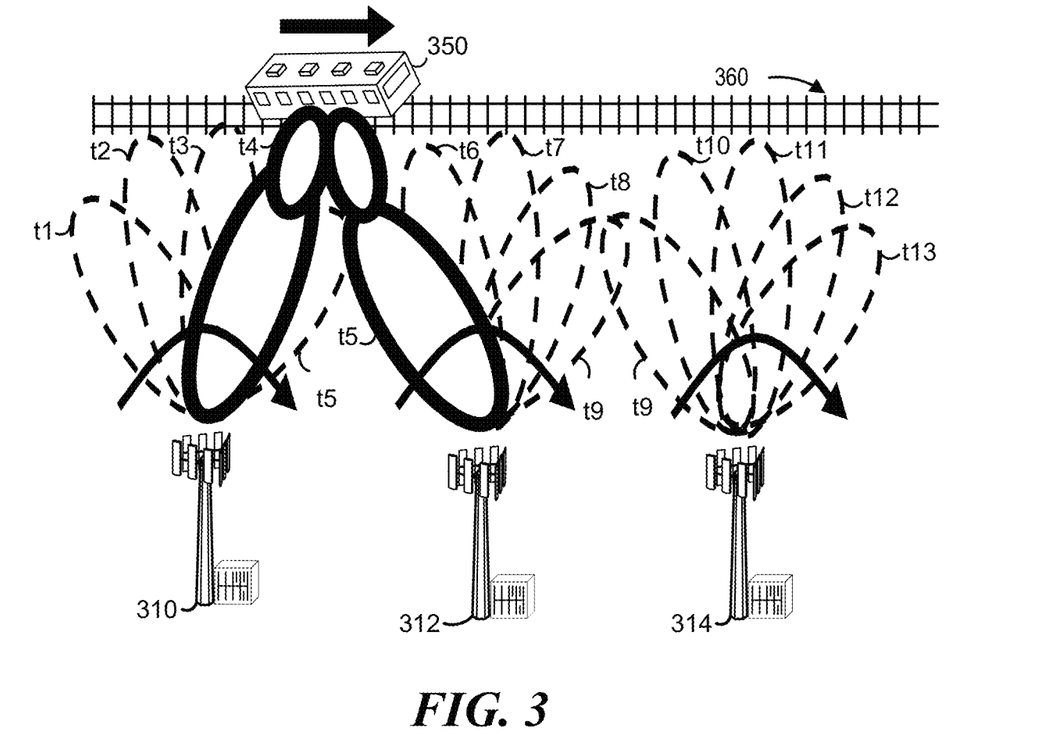
FIG. 3 is a diagram illustrating analog beam management for high speed train scenarios, according to aspects of the present disclosure.

FIG. 3 is a diagram illustrating analog beam management for high speed train scenarios, according to aspects of the present disclosure. In FIG. 3, a UE 350 is travelling on a train along a train track 360 in the direction of the arrow. A beam from a first transmit and receive point (TRP) 310 sweeps from time t1 to time t5 to follow the UE 350. A beam from a second TRP 312 also sweeps to follow the UE 350 from time t5 to time t9 as it moves along the track 360. A beam from a third TRP 314 sweeps to follow the UE 350 from time t9 to time t13 as it continues to move along the track 360. There are multiple candidate beams for data transmission. Each candidate beam may be associated with a synchronization signal block (SSB) or a channel state information reference signal (CSI-RS). The TRPs 310-314 select the best beam among candidate beams based on UE reporting.

Figure 4:
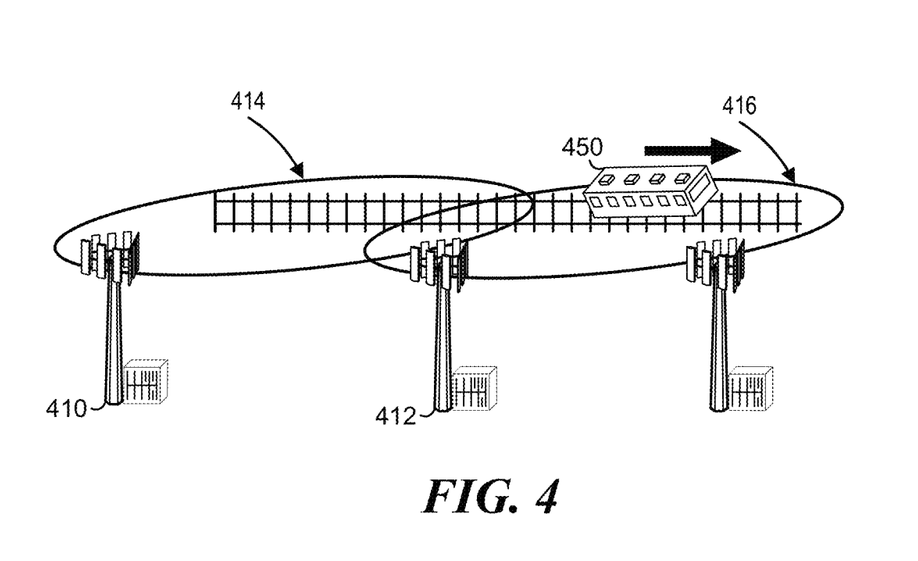
FIG. 4 is a diagram illustrating fixed beams alongside a railway for high speed train scenarios, according to aspects of the present disclosure.

FIG. 4 is a diagram illustrating fixed beams alongside a railway for high speed train scenarios, according to aspects of the present disclosure. In FIG. 4, a fixed analog beam 414, 416 from each TRP 410, 412 is aligned to provide coverage for a UE 450 travelling on the high speed train. In this example of beam management for the high speed train (HST) scenario, only one beam 414, 416 is transmitted from each TRP 410, 412. There is only one candidate beam for data transmission. One candidate beam may be associated with an SSB or a CSI-RS.

Different beam scenarios exist because high speed train scenarios may have different characteristics from other normal deployment scenarios. For example, remote radio heads (RRHs) or transmit and receive points (TRPs) can have different layouts for the different scenarios. For the high speed train scenario, the RRHs and TRPs are generally located alongside a railway, as seen in FIGS. 3 and 4. For a normal scenario, there is no similar characteristic. For the high speed train scenario, the channels are usually line of sight (LOS) and have a high Doppler frequency. In normal scenarios, the channels may be non-line of sight with a low Doppler frequency. In the high speed train scenario, the UE location and movement are predictable. In the normal scenario, the UE movement may be unpredictable.

Aspects of the present disclosure describe how a network (e.g., base station or gNB) detects a high speed train scenario, groups UEs based on whether they are in the high speed train scenario, and efficiently signals to the group of UEs. Although the present description is with respect to a high speed train scenario, the present disclosure contemplates other scenarios where grouping would reduce signaling.

In a first aspect of the present disclosure, the base station detects the high speed train scenario for a UE and informs the UE that it is part of a group. The base station may detect the high speed train scenario by estimating the UE's movement (e.g., based on received uplink signals) either from one TRP or from multiple TRPs. For example, the base station can estimate the Doppler shift based on received uplink signals from one TRP (or multiple TRPs). In another example, the base station may determine the UE belongs in the high speed train group based on a trajectory history of the UE.

In a high speed train scenario, a gNB may frequently transmit some type of configuration updates (e.g., timing advance (TA) adjustment commands) to UEs in the train, due to the high mobility. Further, a gNB may send the TA adjustment commands to a large number of UEs in the same train at the same time. To reduce overhead, it may be beneficial to group the UEs in the same train, and then send a common TA adjustment command to the grouped UEs.

Aspects of the present disclosure allow a gNB to dynamically group UEs in a group based on signaling. The gNB can add or delete a UE from a group. Once a group is formed, the gNB can send a common command to request all UEs in the group to make the same configuration change, such as a timing advance adjustment. In addition to a timing advance adjustment, the gNB may also send a common command to adjust other UE common configurations (e.g., beam configurations and/or power control configurations).

Due to the high mobility of UEs in a high speed train scenario, a gNB may frequently update some configurations of all UEs on a train. One example of such a configuration is a timing advance (TA) parameter. The timing advance parameter may addresses propagation delays for uplink transmissions and may be based on a round trip time between a UE and a gNB. The timing advance changes as the UE's location changes. Different UEs in a cell generally have different timing advance values. On a train, however, all UEs may have the same or a similar timing advance value. In 3GPP systems, the UE adjusts its timing advance based on receiving timing advance adjustment commands from the gNB.

A gNB monitors uplink (UL) signaling (e.g., such as random access signaling), and sends each UE in the train a timing advance adjustment command. The adjustments may occur frequently due to the high speed of the train, which results in a large amount of overhead. Moreover, the number of users in the train may be a large number, resulting in a large amount of signaling, further increasing overhead All UEs on the same train may need similar, if not the same, timing advance adjustment as the trains moves towards or away from a gNB. If UEs on the same train are grouped, then a single common timing advance adjustment for the group will suffice to adjust all of the UEs' timing advance values and reduce overhead.

In aspects of the present disclosure, the gNB decides which UEs should belong to the group. This decision may be based on gNB implementation. In other aspects, the decision may be based on prior beam measurements of UEs. For example, the gNB may observe the reference signal receive power (RSRP) of a received uplink signal and/or whether the UE switches to a same beam as others in the group. In still other aspects, the decision may be based on monitoring a UE's trajectory. For example, UEs traveling with the same trajectory may be grouped together.

According to aspects of the present disclosure, a gNB may dynamically add or delete UEs into a group. For example, a group of UEs may include all UEs on the same train or train car. In these aspects, the gNB transmits a signal, including a group ID, to notify a UE when it is added to a group. After adding the UE to the group, the gNB may indicate a common group configuration to the UE. The common group configuration may include a common control resource set (CORESET) where the UE should monitor for control information, e.g., a search space to receive a group common physical downlink control channel (PDCCH). The common group configuration may also include a common beam configuration (e.g., the beam used to receive group common signaling). The common group configuration may further include a common reference signal or beam to monitor for radio link monitoring (RLM), or beam failure recovery (BFR) of the group configured beam. The gNB may also transmit a signal to notify a UE when it is removed from a group.

According to aspects of the present disclosure, a gNB may identify when a timing advance update is needed for a group. The gNB may identify the need based on monitoring uplink signals from only a subset of UEs in the group, instead of the entire group. When it is time for the update, the gNB sends common group signaling, such as the timing advance update, to the group.

The common group signaling may be sent in different ways. For example, the common group signaling may be carried in group common downlink control information (DCI). The DCI may be sent in a CORESET dedicated for the group common DCI. A portion of the PDCCH carrying the common DCI (e.g., a cyclic redundancy check (CRC)) may be scrambled by a group specific ID. When the UE blind decodes the periodic PDCCH, the UE may identify the scrambled ID and determine if it matches the group ID to which the UE belongs.

In another example, the group common signaling may be carried in a group common physical downlink shared channel (PDSCH) scheduled by a group common PDCCH. UEs in the group may identify the resources and beam to receive the common PDSCH by decoding the group common PDCCH. The group common PDCCH may be as defined in the first example above, except in this case, the PDCCH does not carry the timing advance adjustment update.

According to aspects of the present disclosure, UEs in the group update the timing advance based on receiving the common update signaling. The time to apply the update may be a common value for all UEs in the group or may be a different value for each UE based on its configuration and/or capability. For example, there may be a common time to apply changes for a timing advance update for a common PDCCH transmission. In another example, there may be an individual time for each UE to apply changes for a timing advance update. For example, individual times to apply the changes of a timing advance adjustment may be based on a UE's decoding capability.

The UEs may send acknowledgments (ACKs) in response to successfully receiving a common update. Acknowledgements may be sent in the UE's own unicast channel (e.g., physical uplink control channel (PUCCH) and/or physical uplink shared channel (PUSCH)) rather than in some type of group response channel. Thus, the gNB may retransmit the update individually to each UE that missed the original transmission, which was sent to the entire group.

Although the preceding description was primarily with respect to timing advance updates, other types of configurations that are updated for all UEs in the group at the same time are also contemplated. For example, a transmission configuration indicator (TCI) state may be used for beam forming a PDSCH and/or PDCCH. Because all UEs on the train experience the same environmental changes that affect the beams, a group common TCI state may be applied to the PDSCH and/or PDCCH for all users in the group. The group common TCI state may be applied to a PDSCH and/or PDCCH used for either the group common transmission or a unicast transmission, or both types of transmission.

Another type of configuration that would benefit from group common configuration is an uplink power control configuration. The uplink power control configuration may affect a path loss reference signal (RS) for uplink transmission, and/or other parameters in the uplink power control formula, such as the maximum transmit power, transmit power, target received power, uplink path loss, fractional path loss compensation (alpha), subcarrier spacing, number of resource blocks assigned for transmission, modulation scheme and channel coding rate, and/or power adjustment due to closed loop power control.

Yet another type of configuration that would benefit from a group common configuration is the set of beams the UE is to monitor. The beam monitoring may be for intra-cell and/or inter-cell mobility as the UE moves from one location to another. The beam monitoring may be for radio link monitoring (RLM) and/or beam failure detection (BFD). For example, the UEs may all receive updates for BFD reference signals.

Figure 5:
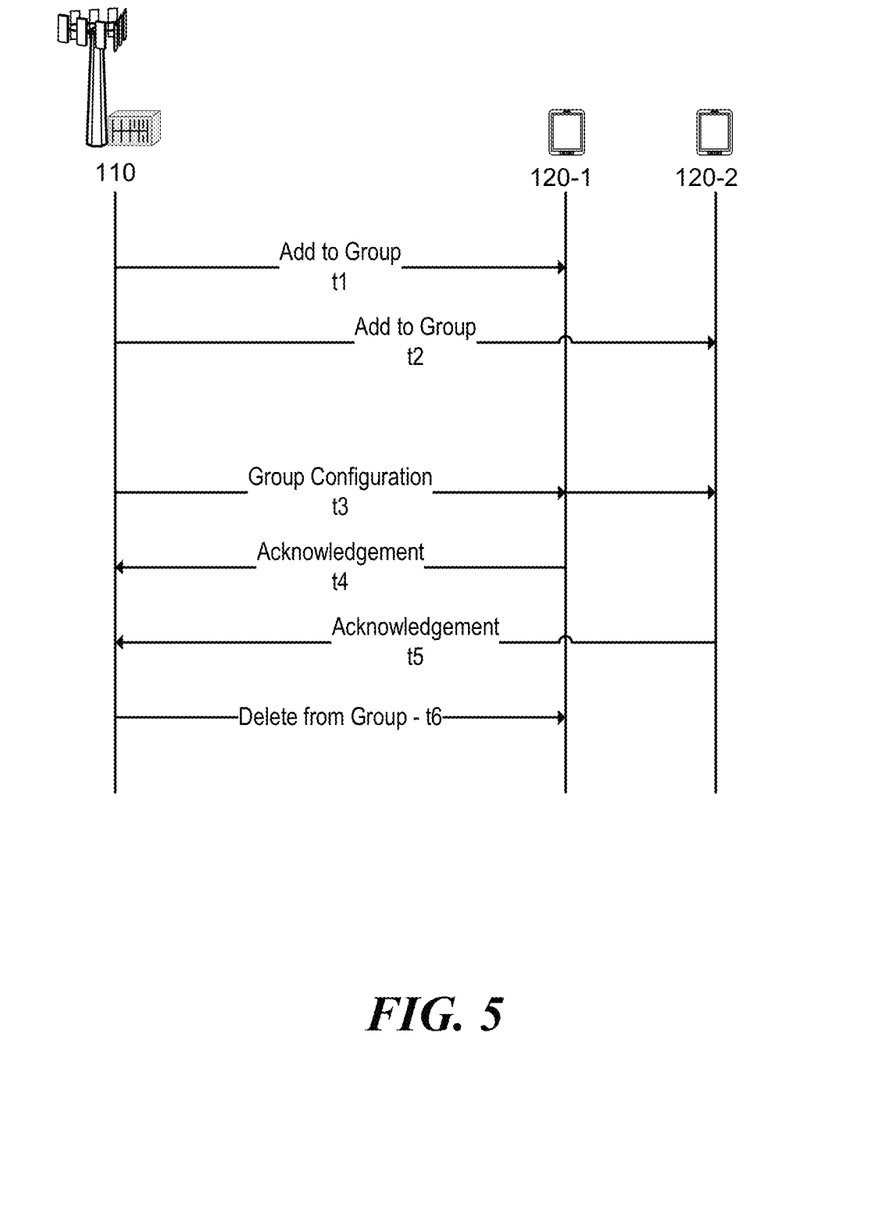
FIG. 5 is a timing diagram showing group configuration changes, according to aspects of the present disclosure.

FIG. 5 is a timing diagram showing group configuration changes, according to aspects of the present disclosure. After a base station 110 determines a first UE 120-1 should be part of a group, the base station 110 transmits a message adding the first UE 120-1 to the group at time t1. After the base station 110 determines a second UE 120-2 should be part of the group, the base station 110 transmits a message adding the second UE 120-2 to the group at time t2. For example, the base station 110 may have determined that the first and second UEs 120-1, 120-2 are on board a high speed train, based on the trajectories of the UEs 120-1, 120-2. The messages may include a group specific ID.

After the base station 110 determines a configuration update, for example a timing advance update, is needed for the group of UEs 120-1, 120-2, at time t3, the base station 110 transmits a group configuration update. The first UE 120-1 acknowledges receipt of the update at time t4. The second UE 120-2 acknowledges receipt of the update at time t5. Each acknowledgment is transmitted via a unicast channel.

After the first UE 120-1 disembarks from the train, the base station 110 recognizes that the first UE 120-1 has left the group and at time t6 transmits a message informing the first UE 120-1 that it is no longer in the group.

Compared with the traditional methods, aspects of the present disclosure save signaling overhead to update configurations, such as timing advance configurations, at the cost of signaling overhead to maintain a group. The formation of the group may be static over a relatively large scale of time. For example, the time between train stops may be on the order of minutes, whereas the time between timing advance updates may be on the order of microseconds. In a high speed train scenario, timing advance updates are frequently needed for a large number of UEs on a train. Signaling for a single update may occur for the entire group of UEs, instead of an update for each UE on the train. The gNB may also have the flexibility to choose whether to apply the group-based method or traditional methods.

Figure 6:
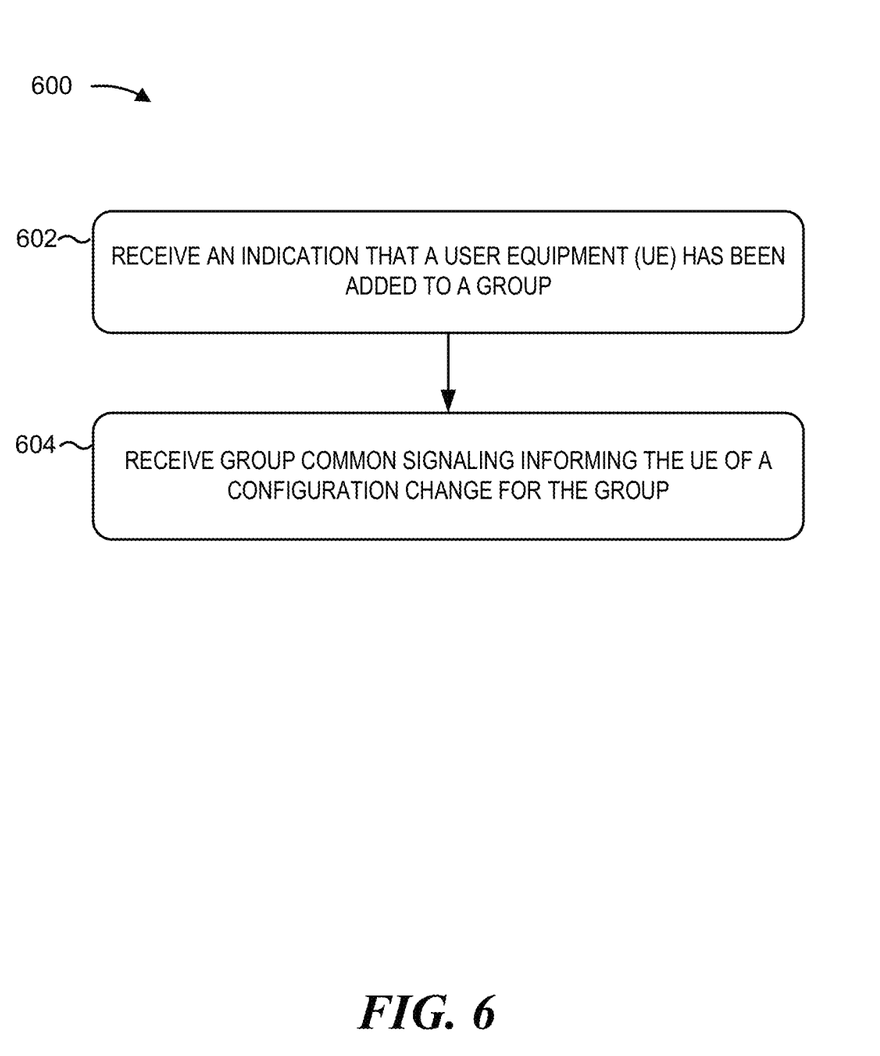
FIG. 6 is a diagram illustrating an example process performed, for example, by a user equipment (UE), in accordance with various aspects of the present disclosure.

FIG. 6 is a diagram illustrating an example process 600 performed, for example, by a user equipment (UE), in accordance with various aspects of the present disclosure. The example process 600 is an example of group-based configuration adjustment. At block 602, the UE receives an indication that the UE has been added to a group. For example, the UE (e.g., using the antenna 252, DEMOD 254, MIMO detector 256, receive processor 258, controller/processor 280, memory 282, and or the like) can receive the indication. At block 604, the UE receives group common signaling informing the UE of a configuration change for the group. For example, the UE (e.g., using the antenna 252, DEMOD 254, MIMO detector 256, receive processor 258, controller/processor 280, memory 282, and or the like) can receive the configuration change.

Figure 7:
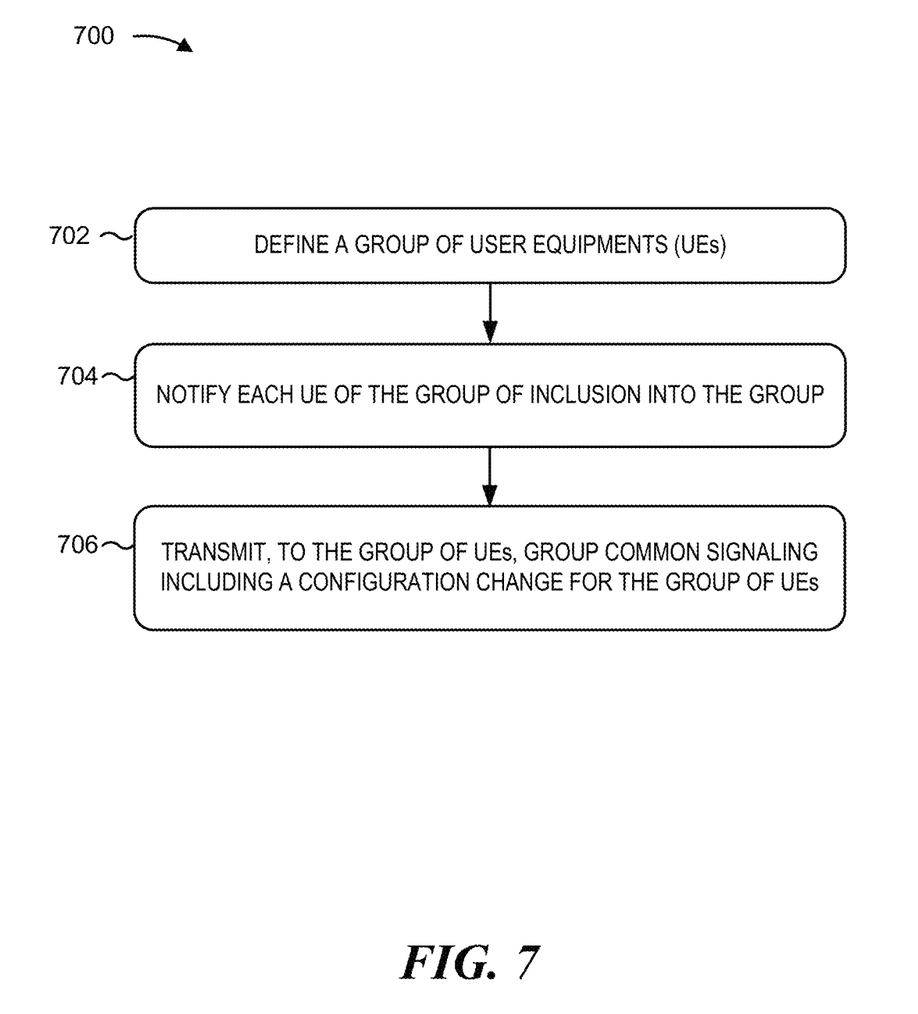
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. The example process 700 is an example of group-based configuration adjustment. At block 702, the base station defines a group of user equipments (UEs). For example, the base station (e.g., using the controller/processor 240, memory 222, and or the like) can define the group. At block 704, the base station notifies each UE of the group of inclusion into the group of UEs. For example, the base station (e.g., using the antenna 234, MOD 232, TX MIMO processor 230, transmit processor 220, controller/processor 240, memory 222, and or the like) can notify the group. At block 706, the base station transmits, to the group of UEs, group common signaling including a configuration change for the group of UEs. For example, the base station (e.g., using the antenna 234, MOD 232, TX MIMO processor 230, transmit processor 220, controller/processor 240, memory 222, and or the like) can transmit the group common signaling to the group.

Implementation examples are described in the following numbered clauses:

1. A method of wireless communication by a user equipment (UE), comprising:
   receiving an indication that the UE has been added to a group; and
   receiving group common signaling informing the UE of a configuration change for the group.
2. The method of clause 1, further comprising receiving a common group signaling configuration comprising:
   at least one of a search space to monitor for a control resource set (CORESET) to receive a group common physical downlink control channel (PDCCH) associated with the group common signaling;
   a common beam configuration for the group common signaling; and
   a common beam for radio link monitoring (RLM) and beam failure recovery (BFR) with respect to the group common signaling.
3. The method of any of the preceding clauses, further comprising receiving an indication that the UE is removed from the group.
4. The method of any of the preceding clauses, in which the group common signaling is carried in group common downlink control information (DCI).
5. The method of clauses 1-3, in which the group common signaling is carried in a group common physical downlink share channel (PDSCH) scheduled by group common downlink control information (DCI).
6. The method of any of the preceding clauses, in which the configuration change comprises a timing advance (TA) update.
7. The method of any of the preceding clauses, further comprising transmitting an acknowledgment (ACK) in response to successfully receiving the group common signaling, the transmitting occurring via a unicast channel.
8. The method of any of the preceding clauses, in which the configuration change comprises a transmission configuration indicator (TCI) update for a physical downlink share channel (PDSCH) or a physical downlink control channel (PDCCH).
9. The method of clause 8, in which the PDSCH or PDCCH is for unicast transmission.
10. The method of clause 8, in which the PDSCH or PDCCH is for group common transmission.
11. The method of any of the preceding clauses, in which the configuration change comprises an uplink power control configuration update.
12. The method of any of the preceding clauses, in which the configuration change comprises an update of a set of beams to monitor.
13. The method of any of the preceding clauses, further comprising determining a time to apply the configuration change.
14. A method of wireless communication by a base station, comprising:

defining a group of user equipments (UEs);
notifying each UE of the group of inclusion into the group of UEs; and
transmitting, to the group of UEs, group common signaling including a configuration change for the group of UEs.
15. The method of clause 14, in which the defining is based on beam measurements for a plurality of UEs, the group of UEs being a subset of the plurality of UEs.
16. The method of any of the preceding clauses, in which the defining is based on trajectories for a plurality of UEs, the group of UEs being a subset of the plurality of UEs.
17. The method of any of the preceding clauses, further comprising transmitting a group common signaling configuration to each UE in the group of UEs, the group common signaling configuration comprising: at least one of a search space to monitor for a control resource set (CORESET) to receive a group common physical downlink control channel (PDCCH) associated with the group common signaling; a common beam configuration for the group common signaling; and a common beam for radio link monitoring (RLM) and beam failure recovery (BFR) with respect to the group common signaling.
18. The method of any of the preceding clauses, further comprising transmitting an indication to a selected UE of the group of UEs that the selected UE is removed from the group of UEs.
19. The method of any of the preceding clauses, in which the group common signaling is carried in group common downlink control information (DCI).
20. The method of clause 14-18, in which the group common signaling is carried in a group common physical downlink share channel (PDSCH) scheduled by group common downlink control information (DCI).
21. The method of any of the preceding clauses, in which the configuration change comprises a timing advance (TA) update.
22. The method of clause 21, further comprising identifying a need for the TA update based on monitoring a subset of the group of UEs.
23. The method of any of the preceding clauses, further comprising receiving an acknowledgment (ACK) from a selected UE in response to the selected UE successfully receiving the group common signaling, the receiving occurring via a unicast channel.
24. The method of any of the preceding clauses, in which the configuration change comprises a transmission configuration indicator (TCI) update for a physical downlink share channel (PDSCH) or a physical downlink control channel (PDCCH).
25. The method of clause 24, in which the PDSCH or PDCCH is for unicast transmission.
26. The method of clause 24, in which the PDSCH or PDCCH is for group common transmission.
27. The method of any of the preceding clauses, in which the configuration change comprises an uplink power control configuration update.
28. The method of any of the preceding clauses, in which the configuration change comprises an update of a set of beams to monitor.
29. The method of any of the preceding clauses, further comprising transmitting, to each UE of the group of UEs, a time to apply the configuration change.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:
1. A method of wireless communication by a user equipment (UE), comprising:
receiving an indication that the UE has been added to a group;
receiving group common signaling informing the UE of a configuration change for the group;
applying the configuration change at a UE specific time, the UE specific time being associated with a decoding capability of the UE; and
receiving an indication that the UE is removed from the group.

2. The method of claim 1, further comprising receiving a common group signaling configuration comprising:
- at least one of a search space to monitor for a control resource set (CORESET) to receive a group common physical downlink control channel (PDCCH) associated with the group common signaling;
- a common beam configuration for the group common signaling; and
- a common beam for radio link monitoring (RLM) and beam failure recovery (BFR) with respect to the group common signaling.

3. The method of claim 1, wherein the group common signaling is carried in group common downlink control information (DCI).

4. The method of claim 1, wherein the group common signaling is carried in a group common physical downlink share channel (PDSCH) scheduled by group common downlink control information (DCI).

5. The method of claim 1, wherein the configuration change comprises a timing advance (TA) update.

6. The method of claim 1, further comprising transmitting an acknowledgment (ACK) in response to successfully receiving the group common signaling, the transmitting occurring via a unicast channel.

7. The method of claim 1, wherein the configuration change comprises a transmission configuration indicator (TCI) update for a physical downlink share channel (PDSCH) or a physical downlink control channel (PDCCH).

8. The method of claim 7, wherein the PDSCH or PDCCH is for unicast transmission.

9. The method of claim 7, wherein the PDSCH or PDCCH is for group common transmission.

10. The method of claim 1, wherein the configuration change comprises an uplink power control configuration update.

11. The method of claim 1, wherein the configuration change comprises an update of a set of beams to monitor.

12. A method of wireless communication by a base station, comprising:
- defining a group of user equipments (UEs) in accordance with beam measurements for a plurality of UEs, the group of UEs being a subset of the plurality of UEs;
- notifying each UE of the group of inclusion into the group of UEs; and
- transmitting, to the group of UEs, group common signaling including a group common signaling configuration indicating a configuration change for the group of UEs, the group common signaling configuration comprising: a common beam for radio link monitoring (RLM) and beam failure recovery (BFR) with respect to the group common signaling.

13. The method of claim 12, wherein the defining is in accordance with trajectories for a plurality of UEs, the group of UEs being a subset of the plurality of UEs.

14. The method of claim 12, wherein the group common signaling configuration further comprises a search space to monitor for a control resource set (CORESET) to receive a group common physical downlink control channel (PDCCH) associated with the group common signaling.

15. The method of claim 12, further comprising transmitting an indication to a selected UE of the group of UEs that the selected UE is removed from the group of UEs.

16. The method of claim 12, wherein the group common signaling is carried in group common downlink control information (DCI).

17. The method of claim 12, wherein the group common signaling is carried in a group common physical downlink share channel (PDSCH) scheduled by group common downlink control information (DCI).

18. The method of claim 12, wherein the configuration change comprises a timing advance (TA) update.

19. The method of claim 18, further comprising identifying a need for the TA update in accordance with monitoring a subset of the group of UEs.

20. The method of claim 12, further comprising receiving an acknowledgment (ACK) from a selected UE in response to the selected UE successfully receiving the group common signaling, the receiving occurring via a unicast channel.

21. The method of claim 12, wherein the configuration change comprises a transmission configuration indicator (TCI) update for a physical downlink share channel (PDSCH) or a physical downlink control channel (PDCCH).

22. The method of claim 21, wherein the PDSCH or PDCCH is for unicast transmission.

23. The method of claim 21, wherein the PDSCH or PDCCH is for group common transmission.

24. The method of claim 12, wherein the configuration change comprises an uplink power control configuration update.

25. The method of claim 12, wherein the configuration change comprises an update of a set of beams to monitor.

26. The method of claim 12, further comprising transmitting, to each UE of the group of UEs, a time to apply the configuration change.

27. An apparatus for a user equipment (UE) for wireless communication, comprising:
- a memory; and
- at least one processor coupled to the memory, the at least one processor configured to:
  - receive an indication that the UE has been added to a group;
  - receive group common signaling informing the UE of a configuration change for the group;
  - apply the configuration change at a UE specific time, the UE specific time being associated with a decoding capability of the UE; and
  - receive an indication that the UE is removed from the group.

28. The apparatus of claim 27, wherein the at least one processor is further configured to receive a common group signaling configuration comprising:
- at least one of a search space to monitor for a control resource set (CORESET) to receive a group common physical downlink control channel (PDCCH) associated with the group common signaling;
- a common beam configuration for the group common signaling; and
- a common beam for radio link monitoring (RLM) and beam failure recovery (BFR) with respect to the group common signaling.

29. The apparatus of claim 27, wherein the group common signaling is carried in at least one of:
- a group common downlink control information (DCI), or
- a group common physical downlink share channel (PDSCH) scheduled by the group common DCI.

30. The apparatus of claim 27, wherein the configuration change comprises a timing advance (TA) update.

* * * * *